(12) United States Patent
Ueda

(10) Patent No.: US 6,870,469 B2
(45) Date of Patent: Mar. 22, 2005

(54) DISPLAY CONTROLLER FOR DISPLAY DEVICE OF VEHICLE

(75) Inventor: Takahiro Ueda, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/141,836

(22) Filed: May 10, 2002

(65) Prior Publication Data

US 2002/0154003 A1 Oct. 24, 2002

Related U.S. Application Data

(62) Division of application No. 10/053,960, filed on Jan. 24, 2002.

(30) Foreign Application Priority Data

Jan. 26, 2001 (JP) .................................... 2001-019050
Jan. 16, 2002 (JP) .................................... 2002-007578

(51) Int. Cl.⁷ ................................................ B60Q 1/00
(52) U.S. Cl. ................ 340/438; 340/461; 340/462; 340/525; 340/691.6; 700/17; 700/83
(58) Field of Search .......................... 340/525, 461, 340/462, 691.6, 980, 438, 436, 439, 426.15, 457, 459, 945, 984; 700/17, 83; 345/700, 7, 156; 701/35, 36, 29, 1; 307/10.2, 10.1

(56) References Cited

U.S. PATENT DOCUMENTS

| | | | |
|---|---|---|---|
| 3,866,166 A | 2/1975 | Kerscher, III et al. | |
| 4,970,683 A | 11/1990 | Harshaw et al. | |
| 4,977,509 A | 12/1990 | Pitchford et al. | |
| 5,043,727 A | * 8/1991 | Ito | 340/984 |
| 5,063,381 A | 11/1991 | Ito | |
| 5,309,139 A | 5/1994 | Austin | |
| 5,453,939 A | * 9/1995 | Hoffman et al. | 340/461 |
| 5,555,171 A | 9/1996 | Sonehara et al. | |
| 5,764,139 A | 6/1998 | Nojima et al. | |
| 6,009,355 A | * 12/1999 | Obradovich et al. | 701/1 |
| 6,212,483 B1 | 4/2001 | Carew et al. | |
| 6,263,507 B1 | 7/2001 | Ahmad et al. | |
| 6,429,845 B1 | * 8/2002 | Unseld et al. | 345/117 |
| 6,519,511 B1 | * 2/2003 | Oberschachtsiek et al. | 701/1 |
| 6,567,069 B1 | * 5/2003 | Bontrager et al. | 345/156 |
| 2002/0101334 A1 | 8/2002 | Takehiro | |

FOREIGN PATENT DOCUMENTS

JP 07-005817 10/1995

* cited by examiner

Primary Examiner—Davetta W. Goins
(74) Attorney, Agent, or Firm—Varndell & Varndell, PLLC

(57) ABSTRACT

A display screen switches between a monitor display and a trouble display. If a pause switch on the trouble display is operated, the display screen will be fixed to the trouble display for a prescribed time. The display screen can be set to the trouble display until a restart or release switch on the trouble display screen is operated. The monitor display and the trouble display can be cyclically displayed. During cyclical display, a jump switch on the trouble display can be operated, so that the display device will be returned to the monitor display from the trouble display, where the monitor display can be displayed for a prescribed time (for instance, 5 minutes). In addition, a cancel switch on the trouble display can be operated, so that the display screen may be kept returned to the monitor display.

4 Claims, 9 Drawing Sheets

DISPLAY CONTROLLER FOR DISPLAY DEVICE OF VEHICLE

CROSS-REFERENCE TO RELATED APPLICATIONS

This application is a continuation-in-part application of U.S. Ser. No. 10/053,960, filed Jan. 24, 2002, which is pending.

BACKGROUND OF THE INVENTION

1. Field of the Invention

The present invention relates to a display device provided in a driver's room of a vehicle such as a construction machine to display the conditions of respective parts of the vehicle and an abnormality such as a failure generated in the vehicle and more particularly to a display controller for the display device for controlling the contents of the display of the display device.

2. Description of the Related Art

Generally, a display device for displaying the state of a construction machine such as cooling water and an abnormality such as a failure including the deterioration of oil pressure of an engine is provided in the driver's room of the construction machine. This display device is called a monitor panel.

The display screens of a conventional monitor panel are illustrated in FIGS. 1(a), 1(b) and 1(c).

FIGS. 1(a), 1(b) and 1(c) shows monitor screens 11, 12 and 13 for monitoring and displaying the operating states of a construction machine.

On the monitor panel, prescribed positions of the displayed screens 11, 12 and 13 are touched so that the states of the display screens can be shifted to other states.

Specifically, when an engine key is switched on to turn on a power, the display screen of the monitor panel is shifted to a monitor display screen shown in FIG. 1(a) via an initial screen.

The states of respective parts such as the amount of remaining fuel of an engine of the construction machine, the temperature of hydraulic oil of a working machine, the temperature of coolant of the engine, the oil pressure of the engine, etc. are detected by sensors provided in the respective parts of the construction machine. A signal detected by each sensor is inputted to the monitor panel. Then, on the monitor panel, the current state of the construction machine is displayed on the monitor display screen on the basis of the signals detected by the sensors.

As shown in FIG. 1(a), on the monitor display screen 11 are provided a display part 11a for displaying the amount of currently remaining fuel, a display part 11b for displaying the current temperature of the hydraulic oil of the working machine, a display part 11c for displaying the current temperature of the coolant of the engine, a display part 11d for displaying the current oil pressure of the engine, etc. An operator visually recognizes the display parts 11a to 11d of the monitor display screen 11 so that the operator can recognize the conditions of the respective parts of the construction machine.

When a button 11e on the monitor display screen 11 is operated, the monitor display screen 11 is shifted to a next monitor display screen 12 shown in FIG. 1(b). Further, when a button 12e on the monitor display screen 12 is operated, the monitor display screen 12 is shifted to a next monitor display screen 13 shown in FIG. 1(c). Further, when a button 13e on the monitor display screen 13 is operated, the monitor display screen 13 is returned to the first monitor screen 11 shown in FIG. 1(a). If the same operations are carried out after that, the same transitions will be repeated. As described above, the monitor display screens are sequentially and cyclically shifted from 11 and 12 to 13, so that all the states of the construction machine can be recognized.

When the detected value of each sensor provided in each part of the construction machine reaches an abnormal value, an error code corresponding to the abnormality is generated in a controller in the vehicle and the display screen of the monitor panel is automatically shifted to a trouble display screen for displaying a trouble such as a failure from the monitor display screen shown in FIGS. 1(a), 1(b) and 1(c).

For instance, when a trouble or problem such as a failure is generated in a pump controller during the display of the monitor display screen 11 shown in FIG. 1(a) on the monitor panel, the monitor display screen 11 is shifted to a trouble display screen 21 shown in FIG. 2(a). In the trouble display screen 21, a trouble showing the contents of "Problem pump controller" is displayed. The operator visually recognizes the trouble display of the trouble display screen 21 so that the operator can recognize the trouble generated in the construction machine.

The monitor display screen 11 shown in FIG. 1(a) and the trouble display screen 21 shown in FIG. 2(a) are alternately displayed at prescribed intervals, for example, at intervals of 5 seconds. Thus, while the operator recognizes the contents of the trouble generated in the construction machine, he can continuously perform the operation of the construction machine.

In the construction machine, a plurality of problems or troubles may be possibly generated at the same time. For instance, three kinds of troubles may be generated. If three kinds of troubles (called them a first trouble, a second trouble and a third trouble, hereinafter) are generated while the monitor display screen 11 shown in FIG. 1(a) is displayed on the monitor panel, the monitor display screen 11, the first trouble display screen 21 on which the first trouble is displayed, a second trouble display screen 22 on which the second trouble is displayed and a third trouble display screen 23 on which the third trouble is displayed will be cyclically displayed as shown in FIG. 4. In other words, the monitor display screen 11, the first trouble display screen 21, the second trouble display screen 22 and the third trouble display screen 23 are displayed at intervals of, for instance, 5 seconds.

As described above, when a trouble is generated in the construction machine, the monitor display screen 11 and the trouble display screen 21 are alternately displayed, or the monitor display screen 11 and the trouble display screens 21, 22 and 23 are cyclically displayed. Therefore, the operator needs to recognize the contents of the display of the trouble display screen 21 in a short time (for instance, 5 seconds). Accordingly, the operator cannot sufficiently recognize the contents of the display of the trouble display screen 21.

Further, the operator may, sometimes, have a desire to completely recognize not the trouble display screen 11, but the monitor display screen 11. Still further, the operator may have a desire to sufficiently recognize not the display screen which is currently displayed, but a display screen which will be displayed or the display screen which has been already displayed.

Still further, even when a trouble is generated, the operator of the construction machine needs to continuously operate and manipulate the construction machine by paying his attention to the trouble.

However, since the monitor screen 11 and the trouble display screen 21 are alternately displayed, or the monitor display screen 11, and the trouble display screens 21, 22 and 23 are cyclically displayed, the operator can, undesirably, continuously and visually recognize the contents of the display of the monitor display screen 11 only for a short time (for instance, 5 seconds). Further, when a plurality of trouble display screens are displayed, the monitor display screen 11 cannot be visually recognized for a long time when the trouble display screens 21, 22 and 23 are displayed. Therefore, the state of the construction machine cannot be completely grasped so that there exists a fear that a trouble may arise in operating and manipulating the construction machine.

Further, when the plural monitor display screens are sequentially displayed, the operator may have, sometimes a desire to return the display screen to a specific monitor display screen to completely recognize the operating state of the vehicle which he specially wants to know.

Still further, the operator may have, sometimes, a desire to return the display screen not to the monitor display screen, but to the trouble display screen so as to completely recognize the contents of the trouble of the vehicle.

SUMMARY OF THE INVENTION

The present invention was proposed by taking the above-described circumstances into consideration and it is a first object of the present invention to provide a display controller for a display device of a vehicle in which the contents of a specific display screen can be completely grasped even when a trouble is generated in the vehicle of a construction machine and a monitor display screen and a trouble display screen are sequentially displayed or a plurality of monitor display screens are sequentially displayed so that one display screen is displayed only for a short period.

It is a second object of the present invention to provide a display controller for a display device of a vehicle in which, a display screen can be returned to one monitor display screen to sufficiently recognize the operating state of the vehicle even when a trouble is generated in the vehicle of a construction machine or the like and a monitor display screen and a trouble display screen are sequentially displayed or a plurality of monitor display screens are sequentially displayed so that one monitor screen is displayed only for a short period, and a display screen can be returned to one trouble display screen to sufficiently grasp the contents of the trouble of the vehicle even when a trouble is generated in the vehicle of the construction machine or the like and the monitor display screen and the trouble display screen are sequentially displayed so that one trouble display screen is displayed only for a short period.

Thus, in order to achieve the first object, according to a first aspect of the present invention, there is provided a display controller for a display device of a vehicle having the display device for displaying a display screen provided in the vehicle to control the contents of the display of the display device so that a plurality of display screens are sequentially displayed, the display controller comprising a switch for fixing the display screen of the display device to a specific display screen so that the contents of the display are controlled to fix the display screen of the display device to the specific display screen in accordance with the operation of the switch.

Now, the present invention according to the first aspect will be described below by referring to FIGS. 1, 2 and 4.

According to the first aspect of the present invention, when the display screen of a display device is shifted from a monitor display screen 11 shown in FIG. 1(*a*) to a trouble display screen 21 shown in FIG. 2(*a*), if a switch means 21*f* on the trouble display screen 21 is operated, the display screen will be fixed to the trouble display screen 21 for a prescribed time (for instance, 2 minutes). Further, the display screen may be kept fixed to a trouble display screen 21' until a release or restart switch means 21*h* on the trouble display screen 21' shown in FIG. 2(*b*) is operated. Further, as shown in FIG. 4, when the monitor display screen 11 and trouble display screens 21, 22 and 23 are cyclically displayed, if the switch means 21*f* on the specific trouble display screen shown in FIG. 1(*a*) is operated, the display screen will be fixed to the specific trouble display screen 21 for a prescribed time (for instance, 2 minutes). Further, as shown in FIGS. 2(*a*) and 2(*b*), the display screen may be kept fixed to the trouble display screen 21' until the release or restart switch means 21*h* on the trouble display screen 21' is operated.

Still further, when the trouble display screen 21 is currently displayed as shown in FIG. 4, a switch means on the trouble display screen 21 which is currently displayed is operated so that the trouble display screen 21 may be shifted to the trouble display screen 22 or 23 which will be displayed to fix the display screen to the trouble display screen 22 or 23. Further, when the trouble display screen 23 is presently displayed in FIG. 4, a switch means on the trouble display screen 23 which is presently displayed is operated so that the trouble display screen 23 may be shifted to the trouble display screen 22 or 21 which has been already displayed to fix the display screen to the trouble display screen 22 or 21.

The display screen may be fixed not to the trouble display screen but to the monitor display screen 11.

When the monitor display screen 11 is currently displayed in FIG. 4, a switch means on the monitor display screen 11 which is currently displayed is operated so that the display screen may be fixed to the monitor display screen 11 which is currently displayed. Further, when the trouble display screen 23 is currently displayed in FIG. 4, the switch means on the trouble display screen 23 which is displayed at present is operated so that the display screen may be shifted to the monitor display screen 11 which will be displayed in future and fixed to the monitor display screen 11. When the trouble display screen 21 is currently displayed in FIG. 4, the switch means on the trouble display screen 21 which is displayed at present is operated so that the display screen may be shifted to the monitor display screen 11 which has been already displayed and fixed to the monitor display screen 11.

Further, when the monitor display screen 11 is currently displayed in FIGS. 1(*a*), 1(*b*) and 1(*c*), the switch means on the monitor display screen 11 which is currently displayed is operated so that the display screen may be fixed to the monitor display screen 11 which is currently displayed. Further, when the monitor display screen 11 is currently displayed in FIGS. 1(*a*), 1(*b*) and 1(*c*), the switch means on the monitor display screen 11 which is displayed at present is operated so that the display screen may be shifted to a monitor display screen 12 which will be displayed in future and fixed to the monitor display screen 12. Further, when the monitor display screen 11 is currently displayed in FIGS. 1(*a*), 1(*b*) and 1(*c*), the switch means on the monitor display screen 11 which is displayed at present is operated so that the display screen may be shifted to a monitor display screen 13 which has been already displayed and fixed to the monitor display screen 13.

According to the first aspect of the present invention, since the display screen is fixed to the display of the specific display screen, the operator can completely and sufficiently recognize the contents of the display of the specific display screen.

In order to achieve the first object, according to a second aspect of the present invention, there is provided a display controller for a display device of a vehicle having the display device provided in the vehicle to display a monitor display screen for displaying the states of the respective parts of the vehicle and a trouble generated in the vehicle so that the contents of the display of the display device are controlled to cyclically display a plurality of kinds of troubles on the monitor display screen, when the plural troubles are generated in the vehicle, the display controller comprising a switch for fixing the trouble display of the monitor display screen, wherein the contents of the display of the display device are controlled so that the trouble display of the monitor display screen is fixed to a trouble display which is currently displayed in accordance with the operation of the switch.

The present invention according to the second aspect will be described below with reference to FIGS. 1(a), 1(b), 1(c), 2(a) and 2(b) and 5.

According to the second aspect of the present invention, as shown in FIG. 5, when the trouble display screens 21, 22 and 23 are cyclically displayed on a part of the monitor display screen 11, if the switch means 21f on the trouble display screen 21 shown in FIG. 2(a) is operated, the display screen will be fixed to the specific trouble display screen 21 for a prescribed time (for instance, two minutes). Further, the display screen may be kept fixed to the trouble display screen 21' until the release or restart switch means 21h on the trouble display screen 21' shown in FIG. 2(b) is operated.

According to the second aspect of the present invention, since the contents of the display of a part on the monitor display screen 11 are fixed to the specific trouble display screen 21, the operator can completely recognize the contents of the display of the specific trouble display screen 21.

In order to achieve the second object, according to a third aspect of the present invention, there is provided a display controller for a display device of a vehicle having the display device for displaying a display screen provided in the vehicle to control the contents of the display of the display device so that a plurality of display screens are sequentially displayed, the display controller comprising a switch for returning the display screen of the display device to a specific display screen so that the contents of the display are controlled to return the display screen of the display device to the specific display screen in accordance with the operation of the switch.

Now, the present invention according to the third aspect will be described a below; by referring FIGS. 2(a), 2(2b), 8 and 9.

According to the third aspect of the present invention, as shown in FIG. 9, when the monitor display screen 11 and the trouble display screens 21, 22 and 23 are cyclically displayed, if a switch means 21g on the trouble display screen 21 shown in FIG. 2(a) is operated, the display screen of the display device will be returned to the monitor display screen 11 from the trouble display screen 21 and the monitor display screen 11 is displayed for a prescribed time (for instance, five minutes). Further, a switch means 21e on the trouble display screen 21' shown in FIG. 2(b) is operated so that the display screen may be kept returned to the monitor display screen 11.

According to the third aspect of the present invention, as shown in FIG. 8, when the monitor display screen 11 and the trouble display screen 21 are alternately displayed, if the switch means 21g on the trouble display screen 21 shown in FIG. 2(a) is operated, the display screen of the display device will be returned to the monitor display screen 11 from the trouble display screen 21 and the monitor display screen 11 is displayed for a prescribed time (for instance, 5 minutes). Further, the switch means 21e on the trouble display screen 21' shown in FIG. FIG. 2(b) is operated so that the display screen may be kept returned to the monitor display screen 11.

Further, the display screen may not be returned to the monitor display screen from the trouble display screen, and may be returned to other monitor screen from the monitor display screen.

Specifically described, when the monitor display screen 12 is currently displayed, in FIGS. 1(a), 1(b) and 1(c), switch means on the monitor display screen 12 which is displayed at present is operated so that the display of the monitor display screen 12 may be returned to that of the monitor display screen 11. Further, when the monitor display screen 13 is currently displayed in FIGS. 1(a), 1(b) and 1(c), a switch means on the monitor display screen 13 which is presently displayed is operated so that the display of the monitor display screen 13 may be returned to that of the monitor display screen 11.

The display screen may be returned not to the monitor display screen, but to the trouble display screen.

According to the third aspect of the present invention, even when the trouble is generated in the vehicle of the construction machine or the like, the monitor display screen and the trouble display screens are sequentially displayed or a plurality of monitor display screens are sequentially displayed so that one monitor display screen is displayed only for a short period, the display screen is returned to the above-described one monitor display screen. Thus, the operating state of the vehicle can be sufficiently recognized. Furthermore, even when the trouble is generated in the vehicle of the construction machine or the like, the monitor display screen and the trouble display screens are sequentially displayed so that one trouble display screen is displayed only for a short period, the display screen is returned to the above-described one trouble display screen. Therefore, the contents of the trouble of the vehicle can be completely recognized.

In order to attain the second object, according to a fourth aspect of the present invention, there is provided a display controller for a display device of a vehicle having the display device provided in the vehicle to display a monitor display screen for displaying the states of the respective parts of the vehicle and trouble display screens for displaying troubles generated in the vehicle so that the contents of the display of the display device are controlled to cyclically display on the display device the monitor display screen and a plurality of kinds of trouble display screens, when the plural troubles are generated in the vehicle, wherein the contents of the display of the display device are controlled so that the monitor display screen is displayed in arbitrary parts of the displaying intervals of a plurality of kinds of trouble display screens.

The present invention according to the fourth aspect will be described below with reference to FIGS. 4 and 10.

According to the fourth aspect of the present invention, when the monitor display screen 11 and the trouble display screens 21, 22 and 23 are cyclically displayed as shown in FIG. 4, the display of the display device is controlled so that the monitor display screen 11 is displayed on the way of each interval (designated by an arrow mark C and an arrow mark D) for displaying these plural trouble display screens 21, 22 and 23. For example, as shown in FIG. 10, not only the monitor display screen 11 is displayed between the trouble display screen 23 and the trouble display screen 21, but also the monitor display screen 11 is displayed between the trouble display screen 21 and the trouble display screen 22 and the monitor display screen 11 is displayed between the trouble display screen 22 and the trouble display screen 23.

According to the fourth aspect of the present invention, since the number of times of chances of displaying the monitor display screens 11 is increased, and accordingly, even when the trouble is generated in the vehicle of the construction machine or the like, the state of the vehicle can be completely recognized.

DETAILED DESCRIPTION OF THE PREFERRED EMBODIMENTS

Figure 1:
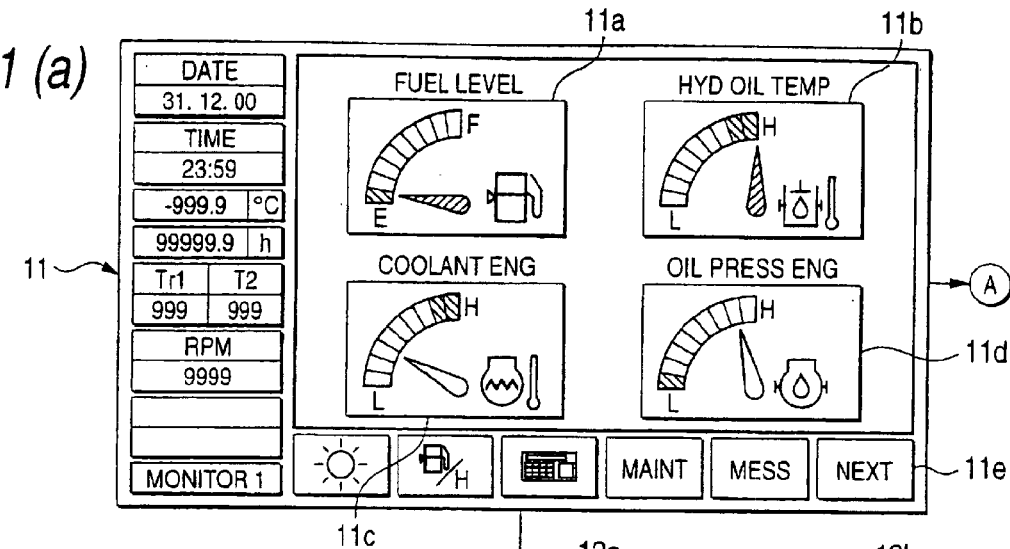
FIGS. 1(a), 1(b) and 1(c) are diagrams showing examples to which monitor display screens according to embodiments move.
Figure 1:
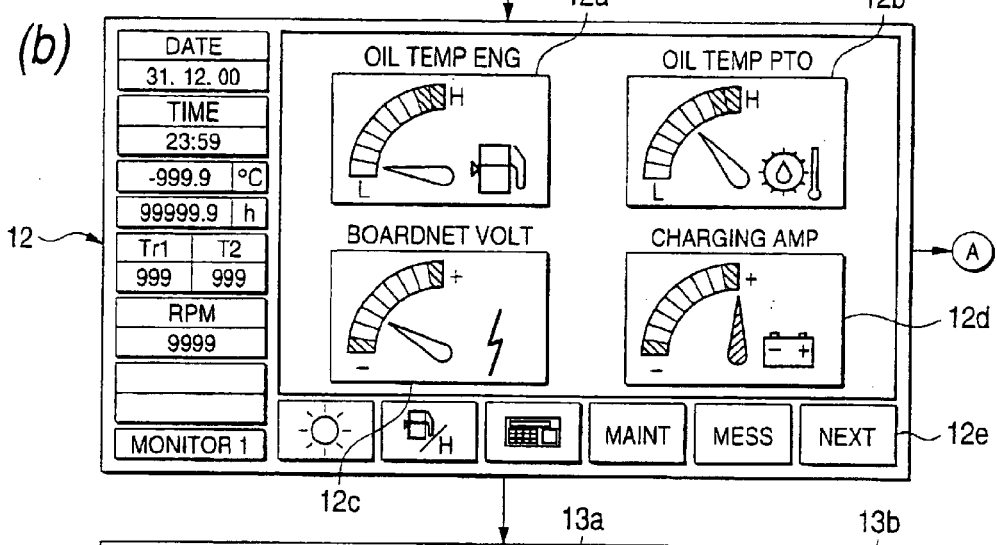
Figure 1:
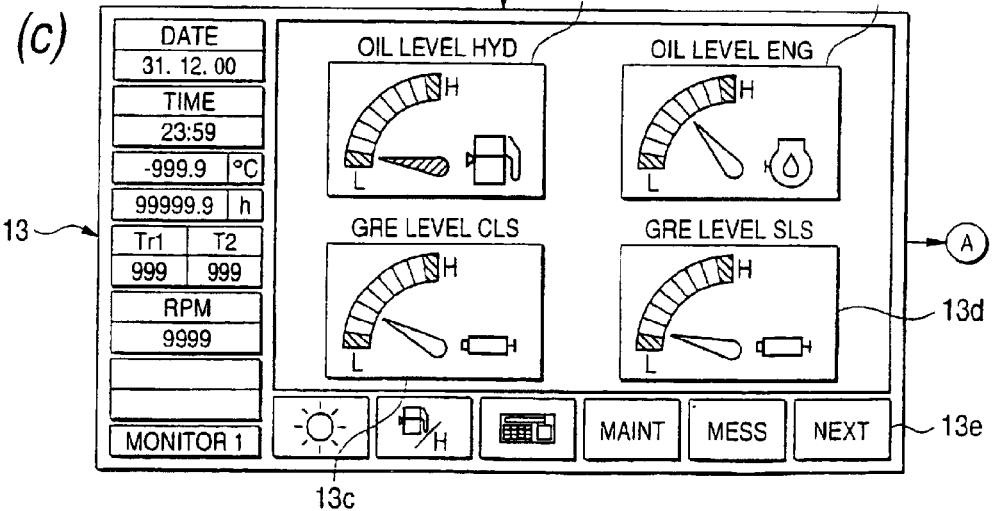

Now, referring to the accompanying drawings, embodiments of a display controller for a display device of a vehicle according to the present invention will be described below.

In the embodiments, a construction machine such as a hydraulic shovel, a wheel loader is employed as a vehicle.

A monitor panel as a display device is provided in the driver's room of a construction machine. On the outer surface of the monitor panel, a display screen and a group of switches comprising operating switches are arranged. A monitor controller is contained in the monitor panel.

The states of respective parts such as the amount of remaining fuel of the engine of the construction machine, the temperature of hydraulic oil of a working machine, the temperature of coolant of the engine, the oil pressure of the engine, etc. are detected by sensors provided in the respective parts of the construction machine. The signals detected by the sensors are inputted to the monitor controller of the monitor panel.

The monitor controller collects the detected values of the sensors detected by the sensors and generates error codes when the detected values of the sensors reach abnormal values. Then, the monitor controller displays error codes indicating the current state of the construction machine such as the temperature of the coolant and the specific trouble state of the construction machine such as the deterioration of the engine oil n the display screen of the monitor panel.

Further, a group of the operating switches of the monitor panel are operated so that control data for controlling the traveling device of the construction machine or the working machine is generated in the monitor controller. The control data is outputted to an external part from the monitor controller and the driving of the construction machine is controlled in accordance with the control data. For instance, any setting switch of the group of operating switches is operated so that the relation between the manipulated variable of an operating lever for the working machine and the amount of work of the working machine, that is, a work mode can be set to any one of a "heavy drill", a "drill", an "adjustment" and a "micro-operation". Further, any setting switch of the group of operating switches is operated so that the capacity of a hydraulic pump and the capacity of a traveling hydraulic motor are controlled. Thus, the transmission position of the hydraulic motor, that is, the travel speed of a vehicle body can be selectively set to any one of "high speed (Hi)" "middle speed (Mi)" and "low speed (Lo)".

First Embodiment

The display screens of a monitor panel according to embodiments are illustrated in FIGS. 1(a), 1(b) and 1(c).

FIGS. 1(a), 1(b) and 1(c) shows monitor screens 11, 12 and 13 for monitoring and displaying the operating states of a construction machine.

On the monitor panel, prescribed positions of the displayed screens 11, 12 and 13 are touched so that the display screens can be shifted to other display screens.

Specifically, when an engine key is switched on to turn on a power, the display screen of the monitor panel is shifted to a monitor display screen 11 shown in FIG. 1(a) via an initial screen.

The monitor controller controls the contents of the display to display the current state of the construction machine on the monitor screen 11 in accordance with the signals detected by the respective sensors.

As shown in FIG. 1(a), on the monitor display screen 11 are provided a display part 11a for displaying the amount of currently remaining fuel, a display part 11b for displaying the current temperature of the hydraulic oil of the working machine, a display part 11c for displaying the current temperature of the coolant of the engine, a display part 11d for displaying the current oil pressure of the engine, etc. An operator visually recognizes the display parts 11a to 11d of the monitor display screen 11 so that the operator can recognize the conditions of the respective parts of the construction machine. In addition, a currently selected work mode and a currently selected transmission position (travel speed) can be also displayed on the monitor display screen 11.

When a button 11e on the monitor display screen 11 is operated, the monitor display screen 11 is shifted to a next monitor display screen 12 shown in FIG. 1(b). As shown in FIG. 1(b), on the monitor display screen 12 are arranged a display part 12a for displaying the present temperature of oil of an engine, a display part 12b for displaying the present temperature of oil of a PTO shaft, a display part 12c for displaying the present voltage of a board-net, a display part 12d for displaying the present voltage of a battery, etc.

Further, when a button 12e on the monitor display screen 12 is operated, the monitor display screen 12 is shifted to a next monitor display screen 13 shown in FIG. 1(c). As shown in FIG. 1(c) on the monitor display screen 13, are arranged a display part 13a for displaying the present amount of hydraulic oil of the working machine, a display part 13b for displaying the present amount of oil of the engine, a display part 13c for displaying the present amount of grease of CLS, a display part 13d for displaying the present amount of grease of SLS or the like.

Further, when a button 13e on the monitor display screen 13 is operated, the monitor display screen 13 is returned to the first monitor display screen 11 shown in FIG. 1(a). If the same operations are carried out after that, the same transitions will be repeated. As described above, the monitor display screens are sequentially and cyclically shifted from 11 and 12 to 13, so that all the states of the construction machine can be recognized.

Further, the monitor display screens are not shifted to other monitor display screens in prescribed order by a manual operation, but selecting buttons for selecting specific monitor display screens may be provided so that the monitor display screen can be shifted to the specific monitor display screen selected by the selecting button. For instance, when the selecting button on the monitor display screen 11 is operated, the monitor display screen 11 is not shifted to the monitor display screen 12 shown in FIG. 1(b), but can be shifted to the monitor display screen 13 shown in FIG. 1(c).

When the detected value of each sensor provided in each part of the construction machine reaches an abnormal value, an error code corresponding to the abnormality is generated in the monitor controller and the display screen of the monitor panel is automatically shifted to a trouble display screen for displaying a trouble such as a failure from the present monitor display screens 11, 12 and 13 shown in FIGS. 1(a), 1(b) and 1(c).

For instance, when a trouble or problem such as a failure is generated in a pump controller during the display of the monitor display screen 11 shown in FIG. 1(a) on the monitor panel, the monitor display screen 11 is shifted to a trouble display screen 21 shown in FIG. 2(a). In the trouble display screen 21, a trouble display showing the contents of "Problem pump controller" is displayed.

As shown in FIG. 2(a), on the trouble display screen 21(called it a first trouble display screen 21), an icon 21a corresponding to the contents of the trouble, an error message 21b indicating the contents of the trouble, the treatment contents 21c for treating the trouble and an error code 21d are displayed as a first trouble display. In addition, on the first trouble display screen 21, a cancel button 21e, a pause button 21f and a jump button 21g are arranged.

The operator visually recognizes the first trouble display of the first trouble display screen 21 so that the operator can recognize the detail of the first trouble ("Problem pump controller") generated in the construction machine.

The monitor display screen 11 shown in FIG. 1(a) and the trouble display screen 21 shown in FIG. 2(a) are alternately displayed at prescribed intervals, for example, at intervals of 5 seconds. Thus, while the operator recognizes the contents of the trouble generated in the construction machine, he can continuously perform the operation of the construction machine.

Figure 3:
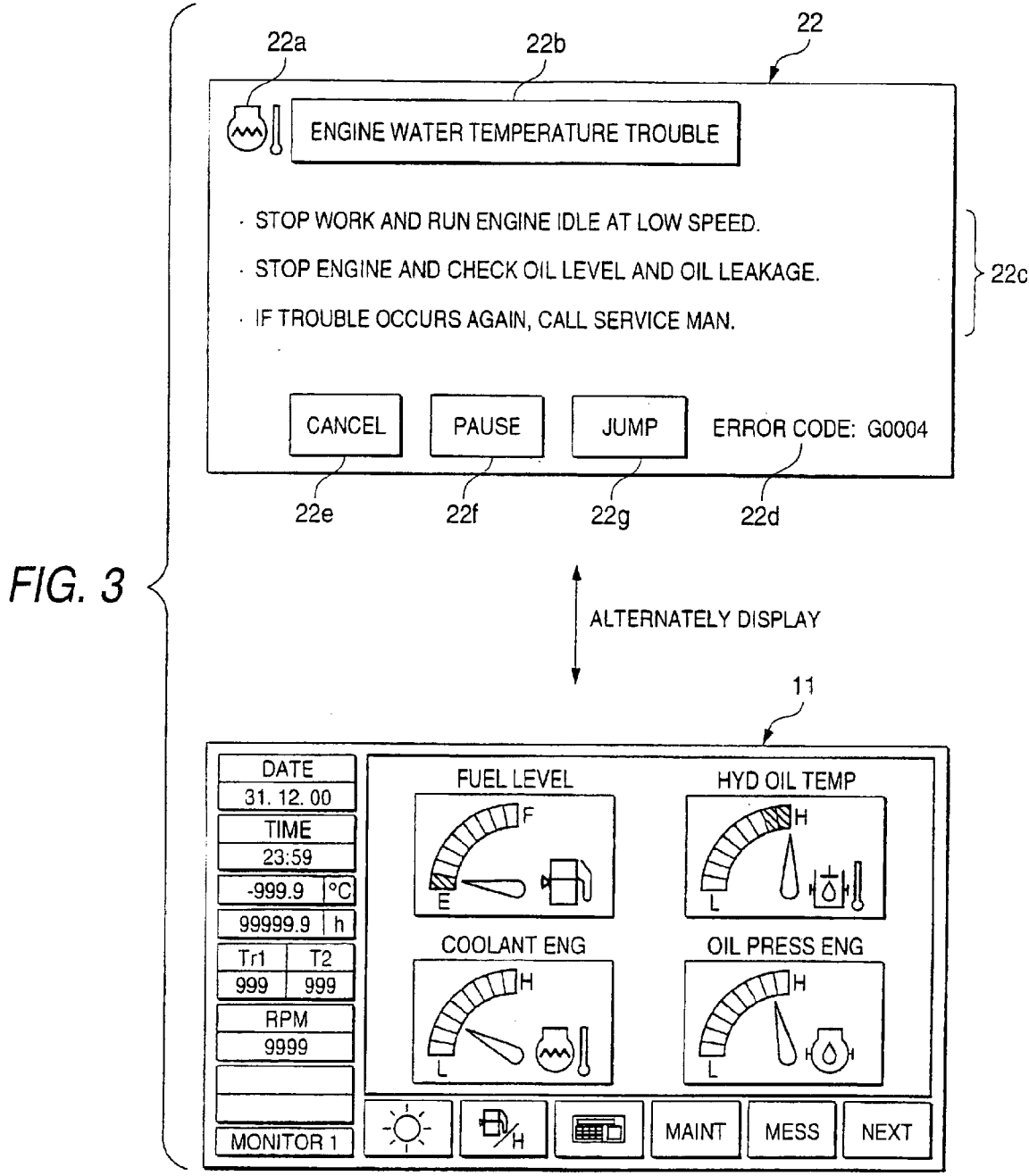
FIG. 3 shows diagrams for illustrating that the monitor display screen and the trouble display screen are alternately displayed.

When a trouble (called it a second trouble) except the first trouble, for instance "Engine coolant temperature trouble" is generated, the present monitor display screen 11 is shifted to a second trouble display screen 22 on which the second trouble is displayed as shown in FIG. 3. As shown in FIG. 3, on the second trouble display screen 22, an icon 22a corresponding to the contents of the trouble, an error message 22b indicating the contents of the trouble, the treatment contents 22c for treating the trouble and an error code 22d are displayed as a second trouble display. In addition, on the second trouble display screen 22, a cancel button 22e, a pause button 22f and a jump button 22g are arranged. Then, the monitor display screen 11 and the second trouble display screen 22 are alternately displayed at prescribed intervals. When a third trouble different from the first trouble and the second trouble is similarly generated, a third trouble display screen 23 on which the third trouble is displayed and the monitor display screen 11 are alternately displayed.

Figure 4:
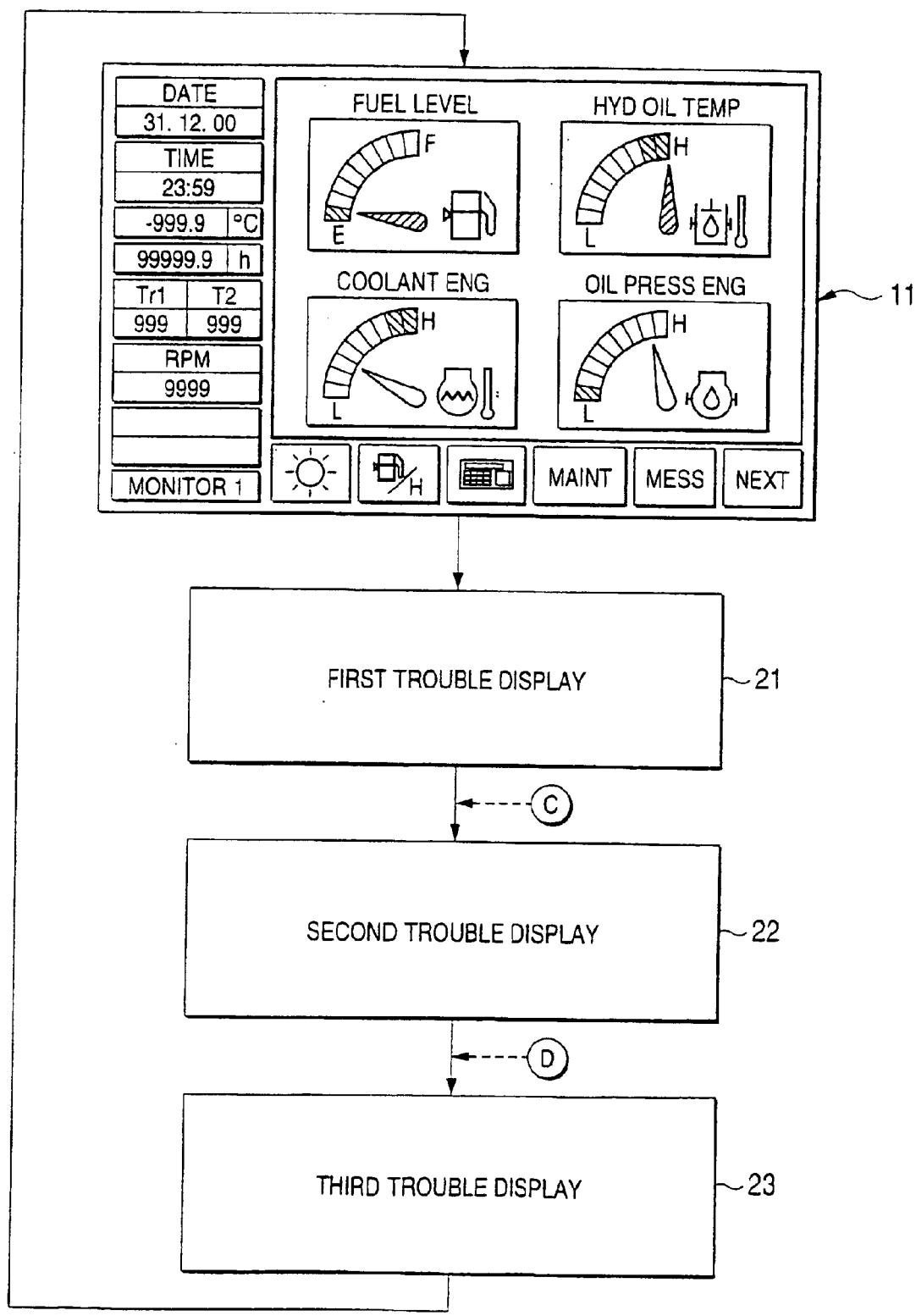
FIG. 4 shows diagrams for illustrating that the monitor display screen and a plurality of trouble display screens are cyclically displayed.

In the construction machine, a plurality of problems or troubles may be possibly generated at the same time. For instance, three kinds of troubles maybe generated. If three kinds of troubles including a first trouble, a second trouble and a third trouble are generated while the monitor display screen 11 shown in FIG. 1(a) is displayed on the monitor panel, the monitor display screen 11, the first trouble display screen 21 on which the first trouble is displayed, a second trouble display screen 22 on which the second trouble is displayed and a third trouble display screen 23 on which the third trouble is displayed will be cyclically displayed as shown in FIG. 4. In other words, the monitor display screen 11, the first trouble display screen 21, the second trouble display screen 22 and the third trouble display screen 23 are displayed at intervals of, for instance, 5 seconds.

In this case, a plurality of trouble display screens can be shifted in regular order of the first trouble display screen 21, the second trouble display screen 22 and the third trouble display screen 23 by a manual operation in a similar manner to that of the monitor display screens.

The trouble display screens are not shifted or changed in prescribed order by a manual operation, but selecting buttons for selecting specific trouble display screens may be provided so that the trouble display screen can be shifted to the specific trouble display screen selected by the selecting button. For instance, the selecting button on the first trouble display screen 21 is operated so that the first trouble display screen 21 is not shifted to the second trouble display screen 22, but can be shifted to the third trouble display screen 23.

Further when the monitor display screens and the trouble display screens are mixed together and sequentially displayed, one display screen may be manually shifted to a next display screen in prescribed order, or one display monitor screen maybe selectively shifted to an arbitrary display screen by operating the selecting button.

Still further, when the monitor display screens and the trouble display screens are mixed together and sequentially displayed, the plural display screens may be automatically shifted or changed.

As described above, according to the present embodiment, since the plural display screens are sequentially displayed on the same screen of the monitor panel, the state of the construction machine and many information related to the abnormality or trouble can be displayed on the screen of the monitor panel without decreasing the size of individual display parts, so that visual recognition characteristics can be improved.

Second Embodiment

In the first embodiment, the monitor display screen is shifted or moved to another display screen by the manual operation. However, the monitor display screen may be sequentially and automatically shifted or changed in regular order of the monitor display screens 11, 12 and 13 without performing a manual operation. Thus, an operator can recognize all the information related to the inner state of the construction machine without manually operating the monitor panel.

As shown in FIG. 4, when a plurality of troubles are generated, the first trouble display screen 21 on which the first trouble is displayed, the second trouble display screen 22 on which the second trouble is displayed, and the third trouble display screen 23 on which the third trouble is displayed may be sequentially and automatically displayed without carrying out the manual operation. That is, for instance, the monitor display screen 11, the first trouble display screen 21, the second trouble display screen 22 and the third trouble display screen 23 are displayed at intervals of 5 seconds. Thus, the operator can recognize all information related to the abnormality or trouble of the construction machine without manually operating the monitor panel.

Further, when the monitor display screen and the trouble display screens are sequentially displayed in a mixed manner, the plural display screens may be automatically shifted or changed.

As described above, according to the second embodiment, even when both the hands of the operator are bound to an operating lever or the like during the operation of the construction machine, and accordingly, the operator cannot freely move the hands, he or she can easily recognize all information necessary for the operation.

When the monitor display screen 11 and the trouble display screen 21 are alternately displayed, or when the monitor display screen 11, and the trouble display screens 21, 22 and 23 are cyclically displayed, the operator is forced to recognize the contents of the trouble display screen 21 in short time (for instance, 5 seconds). Therefore, the operator cannot completely recognize the contents of display on the trouble display screen 21. Now, an embodiment for completely grasping the contents of a generated trouble will be described below.

Third Embodiment

Figure 6:
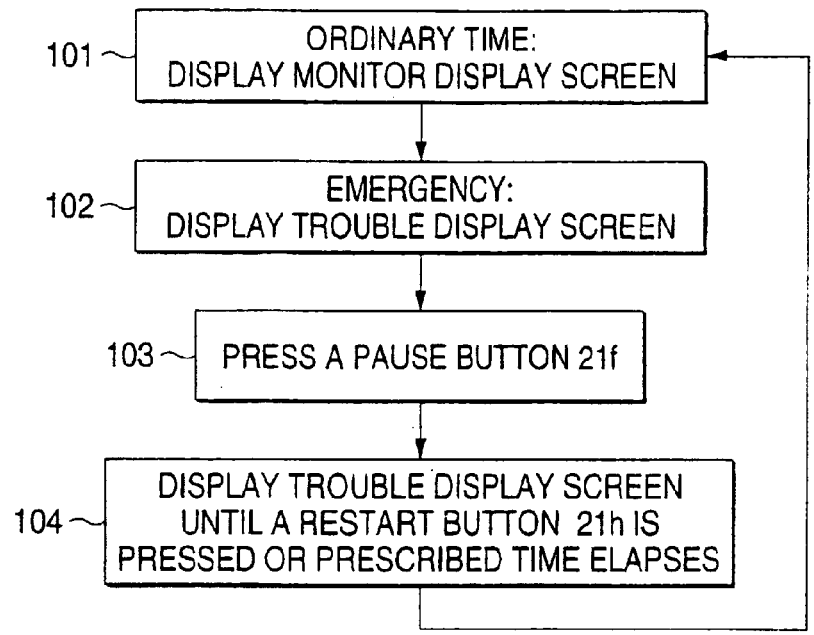
FIG. 6 is a diagram showing a flowchart of the embodiments.

A third embodiment will be described by checking a flowchart shown in FIG. 6

In the third embodiment, a case in which a monitor display screen 11 shown in FIG. 1(*a*) and a trouble display screen 21 shown in FIG. 1(*a*) are alternately displayed on the monitor panel is supposed to be used (steps 101 and 102). When the display screen of the monitor panel is shifted to the trouble display screen 21 (step 102), if a pause button 21*f* on the trouble display screen 21 is touched as shown in FIG. 1(*a*) (step 103), the display screen of the monitor panel will be fixed to the trouble display screen 21 for a prescribed time (for instance, 2 minutes) (step 104). Then, when the prescribed time elapses, the display screen of the monitor panel is returned again to the monitor display screen 11 (step 101).

Figure 2:
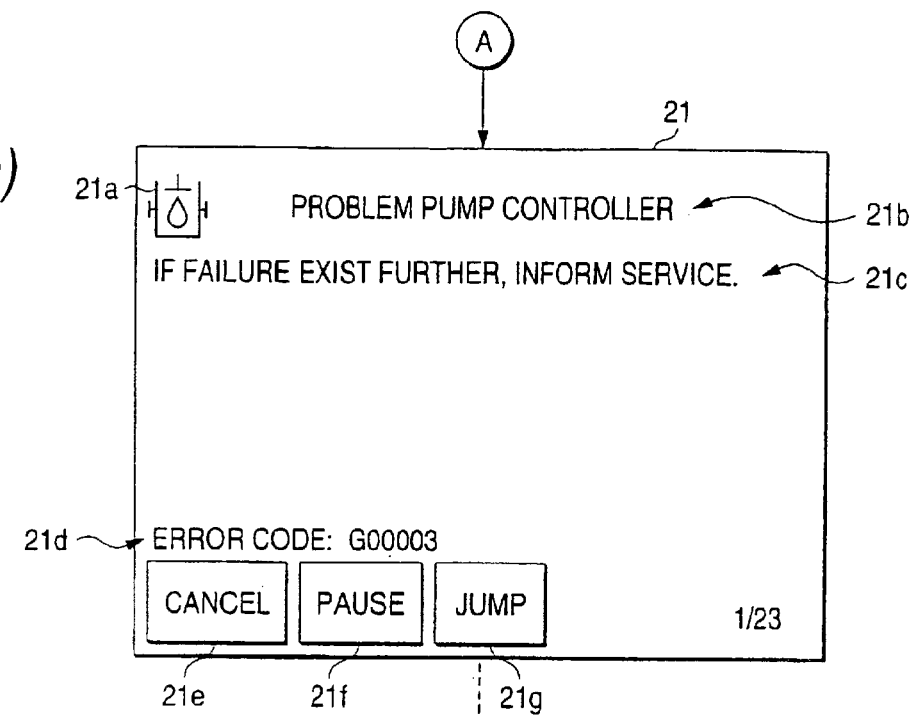
FIGS. 2(a) and 2(b) are diagrams showing the contents of the display of trouble display screens according to the embodiments.
Figure 2:
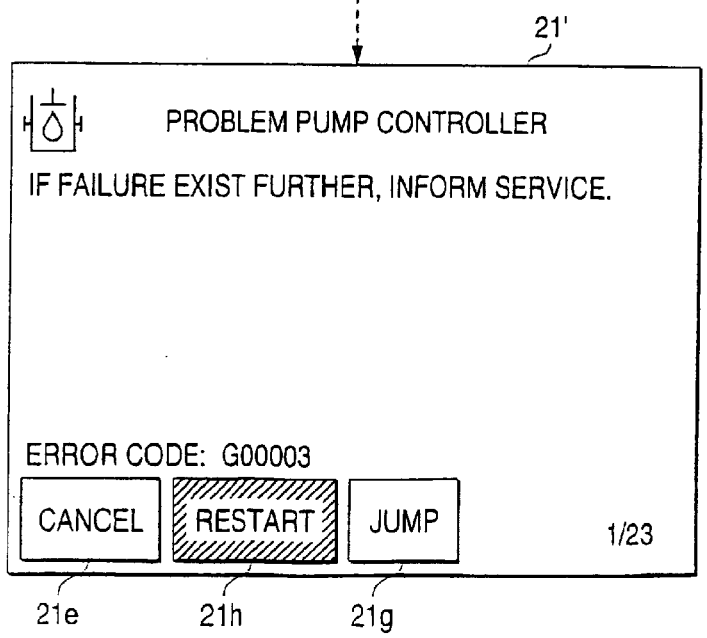

In another embodiment, if a pause button 21*f* on the trouble display screen 21 is touched as shown in FIG. 1(*a*) (step 103), the display screen of the monitor panel will be shifted to a trouble display screen 21' shown in FIG. 2(*b*), the pause button 21*f* will be changed to a restart button 21*h* and the display color of the button 21*h* will be changed to red (it is shown by broken lines). Then, the display screen is fixed to the trouble display screen 21' (step 104) until the restart button 21*h* on the trouble display screen 21' is operated. When the restart button 21*h* on the trouble display screen 21' is touched, the display screen of the monitor panel is returned again to the monitor display screen 11 (step 101).

As described above, according to the third embodiment, since the display screen is fixed to the display of the trouble display screen 21 the operator can completely recognize the contents of the display of the trouble display screen 21.

Fourth Embodiment

A fourth embodiment of the present invention will be described below by checking the flowchart shown in FIG. 6.

In the fourth embodiment, it is supposed that a case in which a monitor display screen 11, a first trouble display screen 21, a second trouble screen 22 and a third trouble screen 23 are cyclically displayed on a monitor panel as shown in FIG. 4 is employed (steps 101 and 102). When the display screen of the monitor panel is shifted to, for example, the first trouble display screen 21(step 102), if a pause button 21*f* on the trouble display screen 21 is touched as shown in FIG. 2(*a*) (step 103), the display screen of the monitor panel will be fixed to the trouble display screen 21 for a prescribed time (for instance, 2 minutes) (step 104). Then, when the prescribed time elapses, the display screen of the monitor panel sequentially shifts again to the next second trouble screen 22 and the third trouble display screen 23, and then returns to the monitor display screen 11 (step 101).

In another embodiment, if a pause button 21*f* on the trouble display screen 21 is operated as shown in FIG. 1(*a*) (step 103), the display screen of the monitor panel will be shifted to a trouble display screen 21' shown in FIG. 2(*b*), the pause button 21*f* will be changed to a restart button 21*h* and the display color of the button 21*h* will be changed to red (it is shown by broken lines). Then, the display screen is fixed to the trouble display screen 21' (step 104) until the restart button 21*h* on the trouble display screen 21' is operated. When the restart button 21*h* on the trouble display screen 21' is touched, the display screen of the monitor panel is sequentially shifted to the next second trouble display screen 22 and the third trouble display screen 23, and then returned to the monitor display screen 11 (step 101).

As described above, according to the fourth embodiment, since the display screen is fixed to the display of the trouble display screen 21, an operator can satisfactorily recognize the contents of the display of the trouble display screen 21.

In the above-described third and fourth embodiments, it is supposed that the case in which, when the trouble display screen 21 is currently displayed, the display screen is fixed the current trouble display screen 21 is used.

However, when the first trouble display screen 21 is currently displayed, a switch means on the first trouble display screen 21 which is displayed at present may be operated to shift the display screen to the second trouble display screen 22 or the third trouble display screen 23 which will be displayed and to fix the display screen to the second trouble display screen or the third trouble display screen 23. Further, when the third trouble display screen 23 is currently displayed in FIG. 4, a switch means on the third trouble display screen 23 which is presently displayed may be operated to shift the display screen to the second trouble display screen 22 or the first trouble display screen 21 which has been already displayed and to fix the display screen to the second trouble display screen 22 or the first trouble display screen 21.

In addition, the display screen may be fixed not to the trouble display screen, but to the monitor display screen 11. That is to say, when the monitor display screen 11 is currently displayed in FIG. 4, a switch means on the monitor display screen 11 which is currently displayed may be operated to fix the display screen to the current monitor display screen 11. Further, when the third trouble display screen 23 is currently displayed in FIG. 4, the switch means on the third trouble display screen 23 which is presently displayed may be operated to shift the display screen to the monitor display screen 11 which will be displayed in future and fix the display screen to the monitor display screen 11. In FIG. 4, when the first trouble display screen 21 is currently displayed, the switch means on the first trouble display screen 21 which is currently displayed may be operated to shift the display screen to the monitor display screen 11 which has been already displayed and fix the display screen to the monitor display screen 11.

Still further, when a plurality of monitor display screens are displayed without showing the trouble display screen, a display screen may be fixed to a specific monitor screen.

Specifically, when the monitor display screen 11 is currently displayed in FIGS. 1(a), 1(b) and 1(c), the switch means on the monitor display screen 11 which is currently displayed may be operated to fix or secure the display screen to the current monitor display screen 11. Further, when the monitor display screen 11 is presently displayed in FIGS. 1(a), 1(b) and 1(c), a switch means on the monitor display screen 11 which is displayed at present may be operated to shift the display screen to a monitor display screen 12 which will be displayed and fix the display screen to the monitor display screen 12. Still further, when the monitor display screen 11 is currently shown, a switch means on the monitor display screen 11 which is displayed at present may be operated to shift the display screen to a monitor display screen 13 which has been already displayed and fix the display screen to the monitor display screen 13.

As described above, according to the second embodiment, since the display screen is fixed to the display of the specific display screen, the operator can completely recognize the contents of the display of the specific display screen.

According to the above-described third and fourth embodiments, although the contents of the trouble are displayed on the screen different from the monitor display screen, it is to be understood that the contents of the trouble may be displayed on the monitor display screen.

Fifth Embodiment

A fifth embodiment will be described below by checking and referring to the flowchart shown in FIG. 6.

Figure 5:
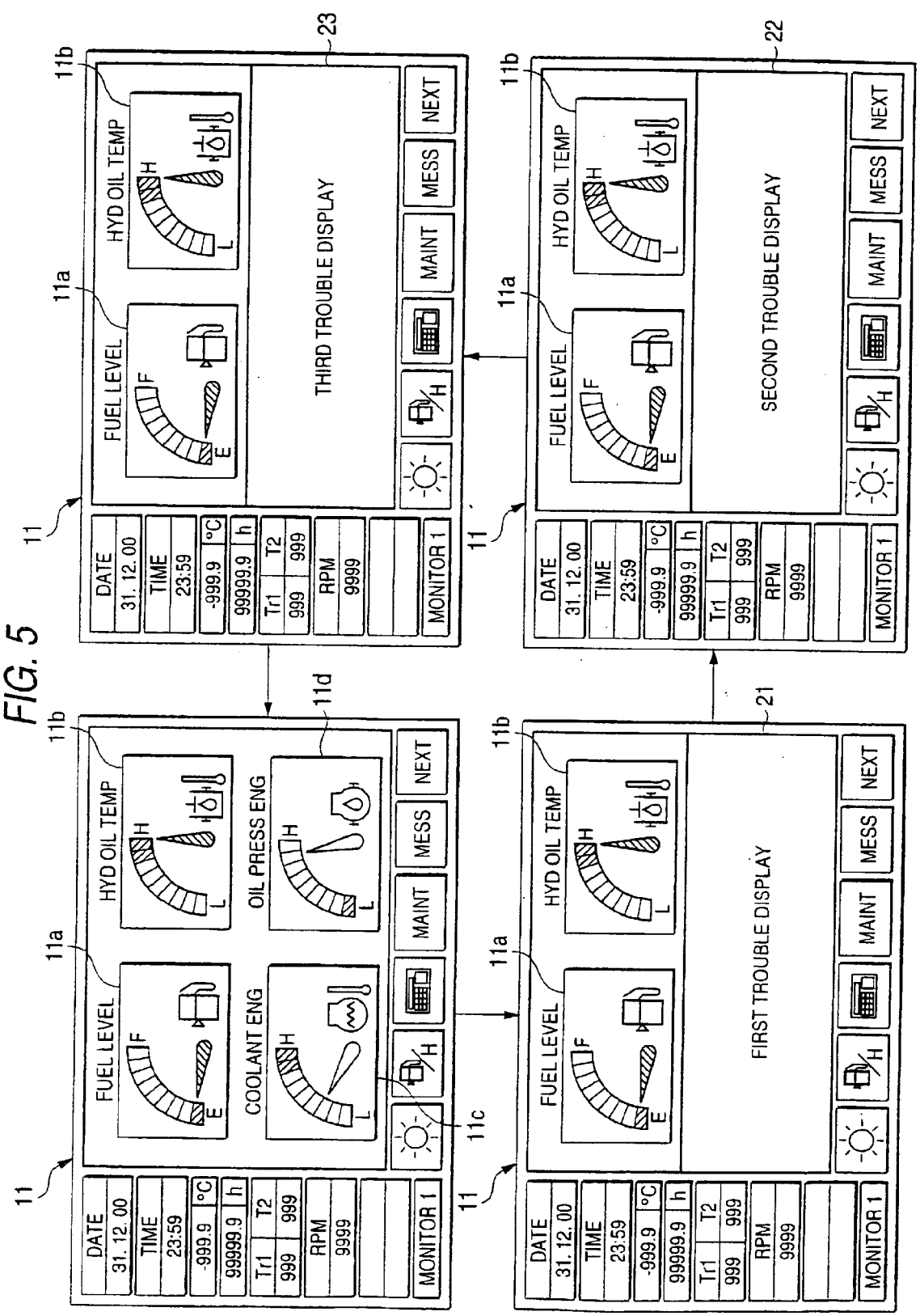
FIG. 5 shows diagrams for illustrating that plural troubles are cyclically displayed on a part of the monitor display screen.

In the fifth embodiment, it is supposed that a case in which the contents of a trouble are displayed in a part of a monitor display screen 11, as shown in FIG. 5 is used. That is, parts corresponding to display parts 11c and 11d of display parts 11a to 11d on the monitor display screen 11 are cyclically changed to monitor displays 11c and 11d, a first trouble display 21, a second trouble display 22 and a third trouble display 23 (steps 101 and 102). When a part of a display part on the monitor display screen 11 is shifted to, for instance, the first trouble display 21 (step 102), if a pause button 21f on the first trouble display 21 is touched (step 103) as shown in FIG. 1(a), a part of the display part on the monitor display screen 11 will be fixed to the first trouble display 21 (step 104) for a prescribed time (for instance, 2 minutes). Then, when the prescribed time elapses, the display part on a part of the monitor display screen 11 is sequentially shifted to a next second trouble display 22 and a third trouble display 23 and returned to the monitor displays 11c and 11d (step 101).

In another embodiment, if a pause button 21f on the trouble display screen 21 is touched as shown in FIG. 2(a) (step 103), the display part on a part of the monitor display screen 11 will be shifted to a trouble display screen 21' shown in FIG. 2(b), the pause button 21f will be changed to a restart button 21h and the display color of the button 21h will be changed to red (it is shown by broken lines). Then, the display screen is fixed to the first trouble display screen 21' (step 104) until the restart button 21h on the trouble display screen 21' is operated. When the restart button 21h on the trouble display screen 21' is touched, the display part on a part of the monitor display panel is returned again to the monitor displays 11c and 11d (step 101).

As described above, according to the fifth embodiment, since a part of the display parts on the monitor screen 11 is fixed to the specific trouble display 21, an operator can sufficiently recognize the contents of the trouble display 21.

In the above-described fifth embodiment, as shown in FIG. 5, the first trouble display 21, the second trouble display 22 and the third trouble display 23 are displayed on parts corresponding to the display parts 11c and 11d of the display parts 11a to 11d on the monitor display screen 11.

However, on the monitor display screen 11, positions where the first trouble display 21, the second trouble display 22 and the third trouble display 23 are displayed can be arbitrarily set.

For example, the first trouble display 21, the second trouble display 22 and the third trouble display 23 may be displayed in the parts corresponding to the display parts 11a and 11b of the display parts 11a to 11d on the monitor display screen 11.

Further, the first trouble display 21, the second trouble display 22 and the third trouble display 23 may be displayed on the parts corresponding to the display parts 11c and 11d of the display parts 11a to 11d on the monitor display screen 11 and the monitor displays 11c and 11d may be displayed on the parts corresponding to the display parts 11a and 11b.

Further, the first trouble display 21, the second trouble display 22 and the third trouble display 23 may be respectively displayed in different parts.

For example, when the first trouble display 21 is shown, the first trouble display 21 may be displayed on the parts corresponding to the display parts 11c and 11d of the respective display parts 11a to 11d on the monitor display screen 11. When the second trouble display 22 is displayed, the second trouble display 22 may be displayed on the parts corresponding to the display parts 11a and 11b of the display parts 11a to 11d on the monitor display screen 11.

As described in the first embodiment and the second embodiment, when the monitor display screen 11 and the trouble display screens 21, 22 and 23 are sequentially displayed, the operator has only a few chances to recognize the monitor display screen 11. Therefore, there arises a fear that the operator cannot satisfactorily understand the state of the construction machine to cause a trouble in an operating work of the construction machine.

Now, there will be described below an embodiment in which, when a plurality of trouble display screens are sequentially displayed, the chances to recognize the monitor display screen are increased so that the operating work of the construction machine can be carried out without failure.

Sixth Embodiment

As shown in FIG. 4, when the monitor display screen 11, and the trouble display screens 21, 22 and 23 are cyclically displayed, a display order is changed so that the monitor display screen 11 is displayed in prescribed parts (shown by arrow marks C and D) on the way of respective intervals of display of the three kinds of trouble display screens 21, 22 and 23. Such a control of display can be readily performed by changing the contents of setting of a controller for a monitor.

Figure 10:
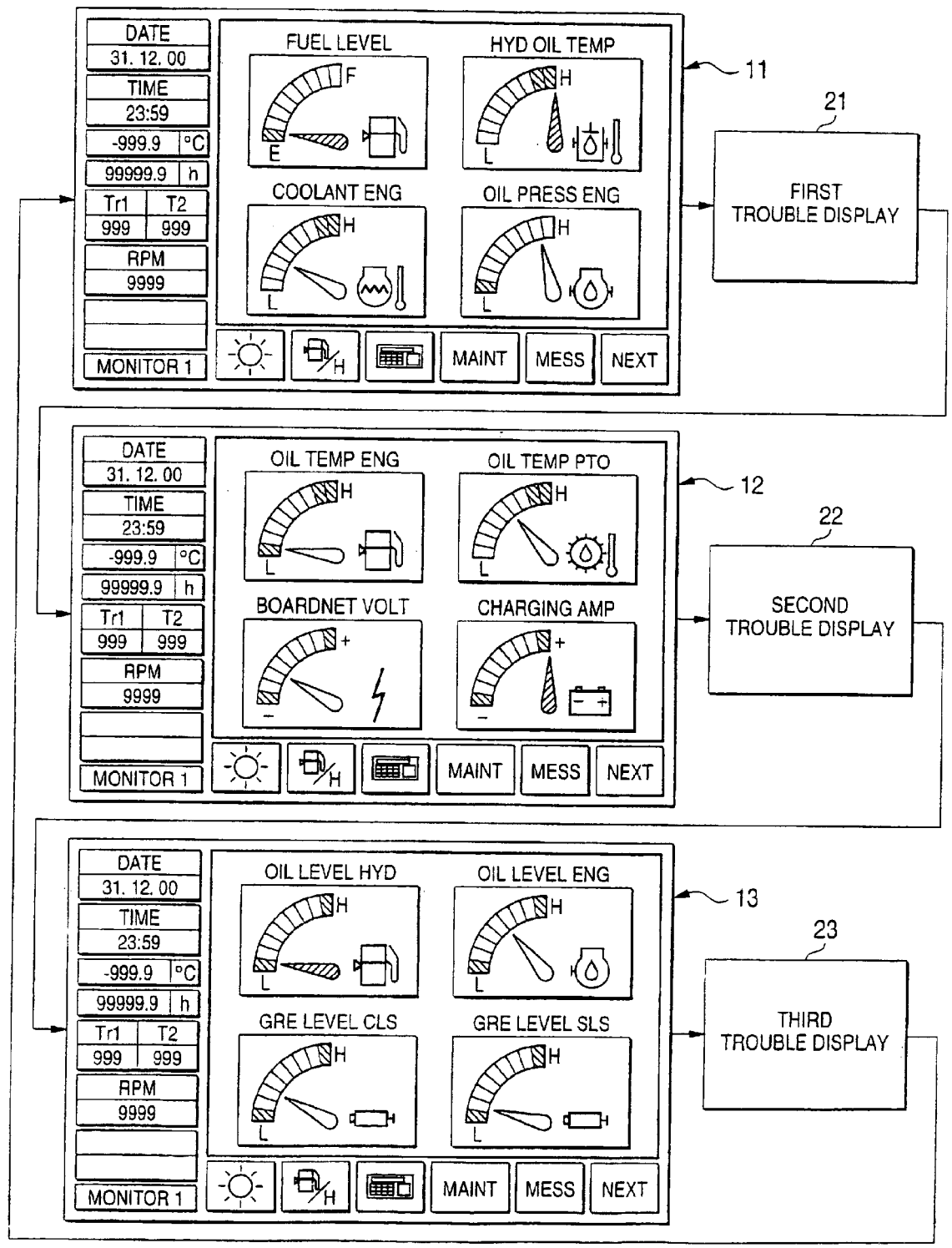
FIG. 10 shows the embodiment in which the monitor display screen, the first trouble display screen, the monitor display screen, the second trouble display screen, the monitor display screen and the third trouble display screen are cyclically displayed.

For instance, as shown in FIG. 10, the monitor display screen 11, the first trouble display screen 21, the monitor display screen 12, the second trouble display screen 22, the monitor display screen 13 and the third trouble display screen 23 are cyclically displayed.

Accordingly, when this display order is compared with the display order shown in FIG. 4, not only the monitor display screen 11 is displayed between the third trouble display screen 23 and the first trouble display screen 21, but also the monitor display screen 11 is displayed between the first trouble display screen 21 and the second trouble display screen 22 and the monitor display screen 11 is also displayed between the second trouble display screen 22 and the third trouble display screen 23 so that the number of chances to display the monitor display screen 11 is increased during one cycle. As described above, since time when the monitor display screen 11 is displayed is lengthened during one cycle, even when any trouble is generated in the construction machine, the condition of the construction machine can be completely recognized.

In FIG. 4, the monitor display screen 11 may be displayed only in the interval between the first trouble display screen 21 and the second trouble display screen 22 as shown by the arrow mark C. Further, the monitor display screen 11 may be displayed only in the interval between the second trouble display screen 22 and the third trouble display screen 23, as shown by the arrow mark D.

As described in the first embodiment and the second embodiment, when the plural monitor display screens are sequentially displayed, if a trouble or abnormality is generated, the trouble display screen 21 and the monitor display screens 11, 12 and 13 will be sequentially displayed, so that the operator has few chances to recognize the trouble display screen 21. Therefore, the operator cannot completely grasp the trouble or abnormality of the construction machine. Accordingly, there exists a fear that the detection of a failure of the construction machine may be possibly delayed.

Now, there will be described below an embodiment, in which, when a plurality of monitor display screens are sequentially displayed, the number of chances to recognize the trouble display screen is increased so that the failure of the construction machine can be detected without delay.

Seventh Embodiment

Referring to FIGS. 1(a), 1(b) and 1(c), when the monitor display screens 11, 12 and 13 are sequentially displayed, if any trouble is generated, the display of the display device will be controlled to show the trouble display screen 21 on the way of respective intervals of display of the plural kinds of monitor display screens 11, 12 and 13. For example, the trouble display screen 21, the monitor display screen 11, the trouble display screen 21, the monitor display screen 12, the trouble display screen 21 and the monitor display screen 13 are cyclically displayed.

According to the seventh embodiment, even when the plural kinds of monitor display screens 11, 12 and 13 are sequentially displayed, since the number of chances to display the trouble display screen 21 is increased, the trouble or abnormality of a vehicle can be sufficiently recognized and the failure of the construction machine can be detected without delay.

Thus, even when the trouble is generated in the construction machine, the operator of the construction machine can continuously operate the construction machine, while paying his attention to the trouble.

However, when the monitor display screen 11 and the trouble display screen 21 are alternately displayed, or when the monitor display screen 11 and the trouble display screens 21, 22 and 23 are cyclically displayed, unfortunately, the operator can continuously recognize the contents of the display of the monitor display screen 11 with his eyes only for a short time (for instance, five minutes). Further, when a plurality of the trouble display screens are displayed, the operator cannot visually recognize the monitor display screen 11 for a long time when the trouble display screens 21, 22 and 23 are displayed. Thus, an embodiment in which the state of the construction machine can be completely grasped will be described below.

Eighth Embodiment

Figure 7:
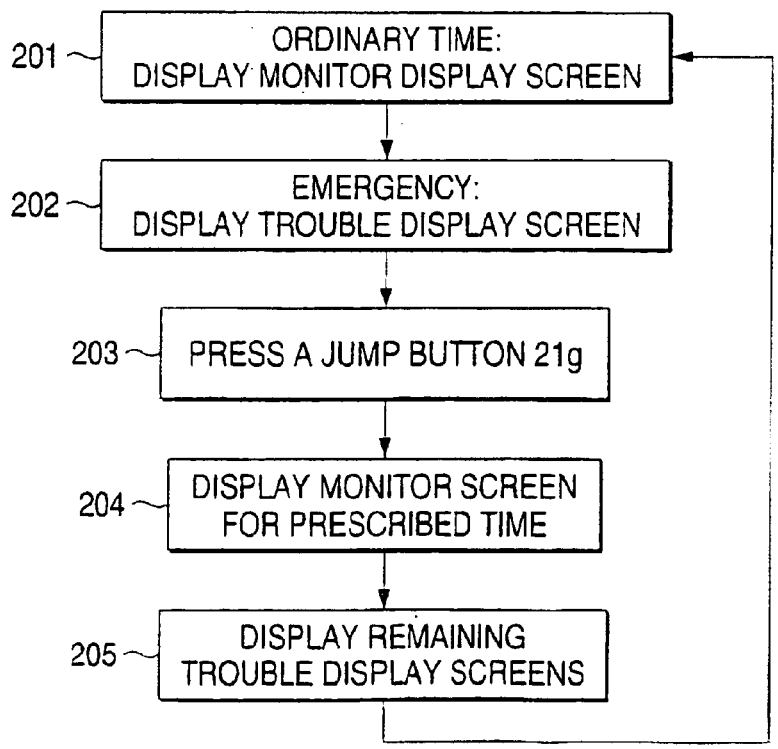
FIG. 7 is a diagram showing a flowchart of the embodiments.

An eighth embodiment of the present invention will be described below by checking and referring to a flowchart shown in FIG. 7.

In the eighth embodiment of the invention, it is supposed that a case in which a monitor screen 11, a first trouble display screen 21, a second trouble display screen 22 and a third trouble display screen 23 are cyclically displayed on a monitor panel is employed (steps 201 and 202). For example, when the display screen of the monitor panel is shifted to the first trouble display screen 21 (step 202), if a jump button 21g on the first trouble display screen 21 is touched as shown in FIG. 2(a) (step 203), the display screen of the monitor panel will be returned to the initial monitor display screen 11 as shown by an arrow mark 31 indicated by broken lines in FIG. 9 and the display screen is fixed to the monitor display screen 11 for a prescribed time (for instance, 5 minutes) (step 204). Then, when the prescribed time elapses, the display screen of the monitor panel shifts to the first trouble display screen 21 from the monitor display screen 11 as shown by an arrow mark 32 indicated by broken lines in FIG. 9. Subsequently, the display screen is sequentially shifted to the second trouble display screen 22 and the third trouble display screen 23 (step 205), and then, returned to the monitor display screen 11 (step 201).

Figure 9:
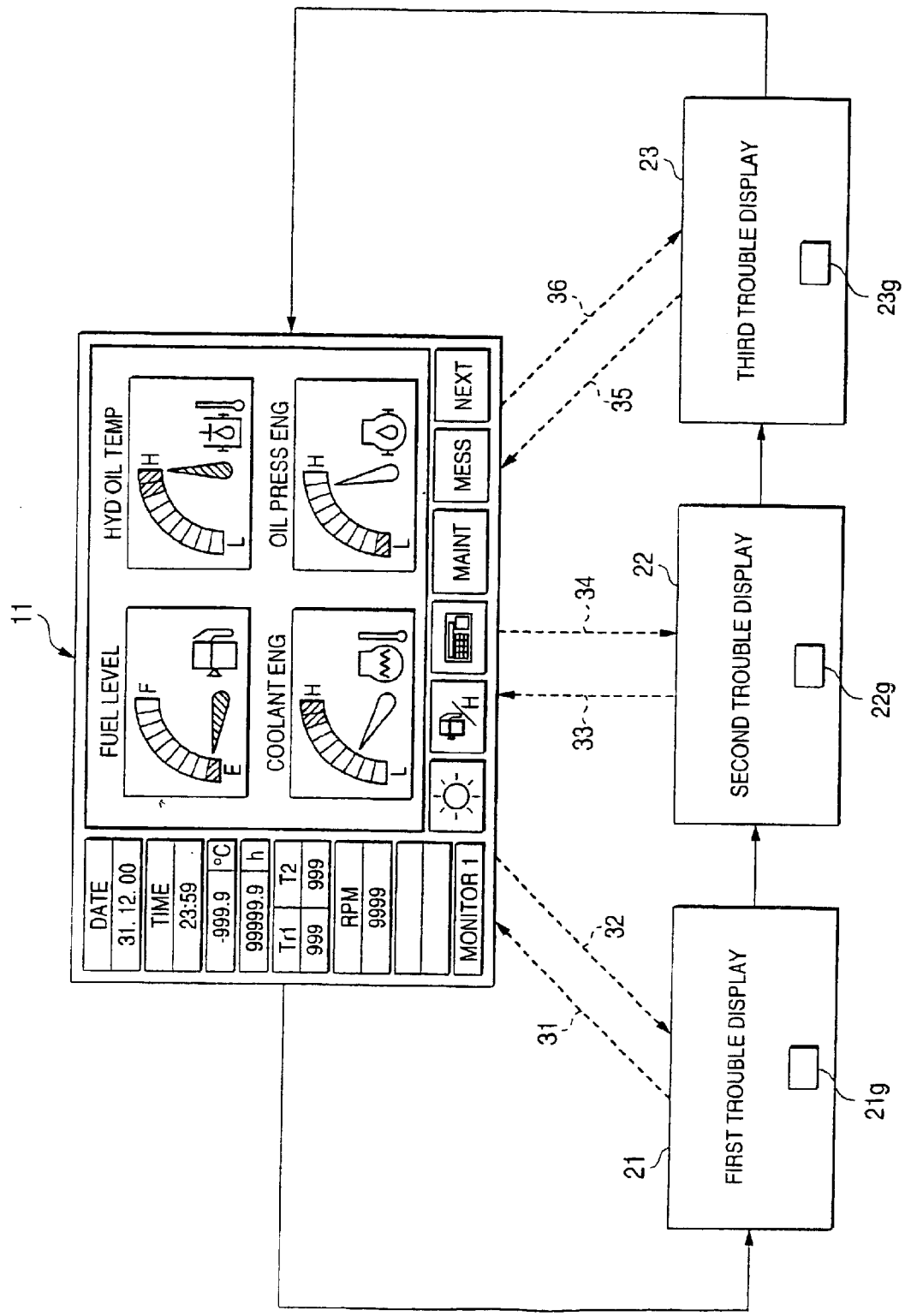
FIG. 9 is a diagram for explaining the example in which, when the monitor display screen and a plurality of trouble display screens are cyclically displayed, a display screen can be arbitrarily returned to the monitor display screen.

When a jump button 22g on the second trouble display screen 22 is touched (step 203) while the second trouble display screen 22 is displayed on the monitor panel, the display screen of the monitor panel is returned to the initial monitor screen 11 as shown by an arrow mark 33 indicated by broken lines in FIG. 9 and the display screen is fixed to the monitor display screen 11 for a prescribed time (for instance, 5 minutes) (step 204). When the prescribed time elapses, the display screen of the monitor panel is shifted to the second trouble display screen 22 as shown by an arrow mark 34 shown by broken lines in FIG. 9. Similarly, when a jump button 23g on the third trouble display screen 23 is touched (step 203) while the third trouble display screen 23 is displayed on the monitor panel, the display screen of the monitor panel is returned to the initial monitor screen 11 as shown by an arrow mark 35 indicated by broken lines in FIG. 9 and the display screen is fixed to the monitor display screen 11 for a prescribed time (for instance, 5 minutes) (step 204). When the prescribed time elapses, the display screen of the monitor panel is shifted to the third trouble display screen 23 as shown by an arrow mark 36 shown by broken lines in FIG. 9.

In another embodiment, a cancel button 21e on the second trouble display screen 21 is touched as shown in FIG. 1(a), so that the display screen of the monitor panel can be kept returned to the monitor display screen 11 from the first trouble display screen 21. In this case, when the engine key is restarted, a cyclic display shown in FIG. 9 can be resumed by carrying out a special operation.

As described above, according to the eighth embodiment of the present invention, since the display screen of the monitor panel is returned to the monitor display screen 11, the state of the construction machine can be carefully and thoroughly recognized even when any trouble is generated in the construction machine.

Ninth Embodiment

A ninth embodiment of the present invention will be described below by checking and referring to the flowchart shown in FIG. 7.

Figure 8:
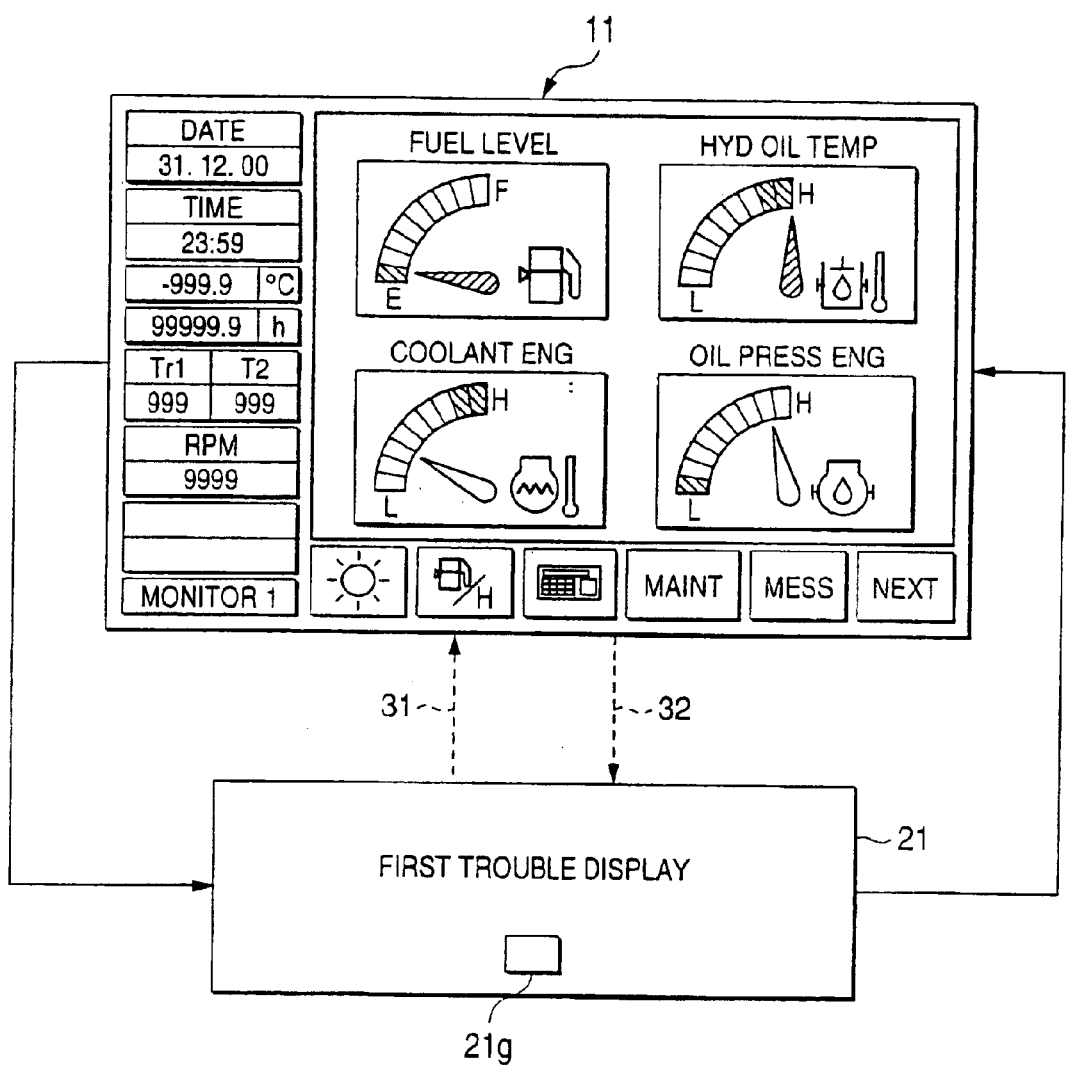
FIG. 8 is a diagram for explaining the embodiment in which, when the monitor display screen and the trouble display screen are alternately displayed, a display screen can be arbitrarily returned to the monitor display screen.

In the ninth embodiment of the invention, it is supposed that a case in which a monitor display screen 11 and a trouble display screen 21 are alternately displayed on a monitor panel as shown in FIG. 8 is used (steps 201 and 202). For example, when the display screen of the monitor panel is shifted to the trouble display screen 21 (step 202), if a jump button 21g on the trouble display screen 21 is touched as shown in FIG. 2(a) (step 203), the display screen of the monitor panel will be returned to the initial monitor display screen 11 as shown by an arrow mark 31 indicated by broken lines in FIG. 8 and the display screen is fixed to the monitor display screen 11 for a prescribed time (for instance, 5 minutes) (step 204). Then, when the prescribed time elapses, the display screen of the monitor panel shifts to the trouble display screen 21 from the monitor display screen 11 as shown by an arrow mark 32 indicated by broken lines in FIG. 8, and then, returned to the monitor display screen 11 (step 201).

In another embodiment, a cancel button 21e on the second trouble display screen 21 is touched as shown in FIG. 2(a), so that the display screen of the monitor panel can be kept returned to the monitor display screen 11 from the first trouble display screen 21. In this case, when the engine key is restarted, a cyclic display shown in FIG. 9 can be resumed by carrying out a special operation.

As described above, according to the ninth embodiment of the present invention, since the display screen of the monitor panel is returned to the monitor display screen 11, the state of the construction machine can be carefully and thoroughly recognized.

According to the above-described eighth and ninth embodiments, although the display screen is returned to the monitor display screen from the trouble display screen, it is to be noted that the display screen may be returned from the monitor display screen to other monitor screen.

Specifically stated, when a monitor screen 12 is currently displayed in FIGS. 1(a), 1(b) and 1(c), a switch means on the monitor display screen 12 which is currently displayed may be operated to return the display screen to a monitor display screen 11. Further, when a monitor display screen 13 is currently displayed in FIGS. 1(a), 1(b) and 1(c), a switch means on the monitor display screen 13 which is currently displayed may be operated to return the display screen to the monitor display screen 11.

In this case, for example, if the monitor display screen 12 is presently displayed, a switch means for selectively returning the display screen to either the monitor display screen 11 or the monitor display screen 13 may be provided on the monitor display screen 12 which is currently displayed to return the display screen to the arbitrary monitor display screen 11 or 13, or a switch means for returning the display screen to the specific monitor display screen 11 may be provided on the monitor display screen 12 which is currently displayed to return the display screen to the specific monitor display screen 11.

Besides, the display screen may be returned not to the monitor display screen, but to the trouble display screen.

An eighth embodiment and a ninth embodiment may be applied to both a case in which the display screens of the monitor panel are automatically and sequentially shifted or changed and a case in which the display screens are sequentially shifted by a manual operation. When the display screens are sequentially shifted by the manual operation, in the case that the present embodiment is applied, the number of the operations of the buttons can be decreased, the labor of the operator can be reduced and the display screen can be rapidly switched to the specific display screen.

As described above, according to the ninth embodiment of the present invention, even when the trouble is generated in the construction machine and the monitor display screen and the trouble display screen are alternately displayed, or a plurality of trouble display screens are sequentially displayed so that one monitor screen is displayed only for a short period, the display screen is returned to the above-described one monitor display screen. Therefore, the operating state of the construction machine can be absolutely recognized. Further, even when the trouble is generated and the monitor screen and the trouble display screens are sequentially displayed so that one trouble display screen is displayed only for a short period, the display screen is returned to the above-described one trouble display screen. Therefore, the contents of the trouble of the construction machine can be completely recognized.

Tenth Embodiment

It is assumed that an "abnormality of the temperature of engine coolant" (second trouble) is to be generated. In this case, as shown in FIG. 9, when the monitor display screen showing the "temperature of the engine coolant" is currently displayed on the monitor panel, if a button is pressed, the monitor display screen will be returned to the second trouble display screen 22 showing the abnormality related to the temperature of the engine coolant.

That is, the temperature of the engine coolant is shown by a gauge on the monitor display screen 11, however, this is the only thing that the operator frequently neglects to continue an operation.

In the tenth embodiment, when the button is pressed, the monitor display screen is returned to the second trouble display screen 22 related to the temperature of the engine coolant. Thus, the operator can be excited to pay attention thereto.

Conversely, when the second trouble display screen 22 showing the abnormality of the temperature of the engine coolant is currently displayed on the monitor panel, if the button is pushed, the second trouble display screen 22 will be returned to the monitor display screen 11 related to the temperature of the engine coolant.

In other word, the operator cannot understand whether the current temperature shows a value near a normal value, or shows fatal temperature only by showing the trouble display screen 22 for the temperature of the engine coolant.

In the present embodiment, when the button is pressed, the trouble display screen is returned to the monitor display screen 11 displaying the gauge for indicating the temperature of the engine coolant, so that the operator can precisely grasp the current temperature and decide whether or not the operation is to be continuously carried out.

The tenth embodiment can be applied to both a case in which the display screens of the monitor panel can be automatically and sequentially shifted or changed and a case in which the display screens are sequentially shifted by the manual operation. When the present embodiment is applied to the case in which the display screens are sequentially shifted by the manual operation, the number of operations of the buttons can be decreased, the labor of the operator can be reduced and the display screen can be rapidly switched to the specific display screen.

In the above-described embodiments, although the monitor panel is assumed to be mounted on the construction machine and is described, it is to be understood that the present invention is not limited thereto, and the present invention may be applied to a display device mounted on an arbitrary vehicle such as an ordinary automobile, or the like.

What is claimed is:

1. A display controller for a display device of a vehicle, the display device being arranged in the vehicle and including a display screen, the display controller displaying monitor screens for providing information about respective parts of the vehicle and displaying a trouble screen for providing trouble information when an abnormality is generated in the vehicle; and when a trouble is generated in the vehicle, the display controller controlling content of the display screen of the display device to cyclically display the trouble screen between the monitor screens.

2. A display controller for a display device of a vehicle, the display device being arranged in the vehicle and including a display screen, the display controller displaying monitor screens for providing information about respective parts of the vehicle and displaying trouble screens for providing trouble information when an abnormality is generated in the vehicle; and when a trouble is generated in the vehicle, the display controller controlling content of the display screen of the display device to cyclically and sequentially display the trouble screens and the monitor screens where monitor screens and trouble screens are alternately displayed.

3. A display controller for a display device of a vehicle, the display device being arranged in the vehicle and including a display screen, the display controller displaying monitor screens for providing information about respective parts of the vehicle and displaying trouble screens for providing trouble information when an abnormality is generated in the vehicle, each of the monitor and trouble screens including a button image arranged on a portion of the display device; the display controller controlling content of the display screen of the display device to sequentially display the trouble screens and the monitor screens, and the display screen is returned to a specific display screen when the button image is pressed.

4. A display controller for a display device of a vehicle, the display device being arranged in the vehicle and including a display screen, the display controller displaying monitor screens for providing information about respective parts of the vehicle and displaying trouble screens for providing trouble information when an abnormality is generated in the vehicle, each of the monitor and trouble screens including a button image arranged on a portion of the display device; the display controller controlling content of the display screen of the display device to sequentially display the trouble screens and the monitor screens, so that one of the monitor display screens and one of the troubled display screens are alternately displayed; and when the button image is pressed, the display screen of the display device is returned to the other display screen of the one of the monitor display screens and one of the troubled display screens that are being alternately display.

* * * * *